Figure 4:
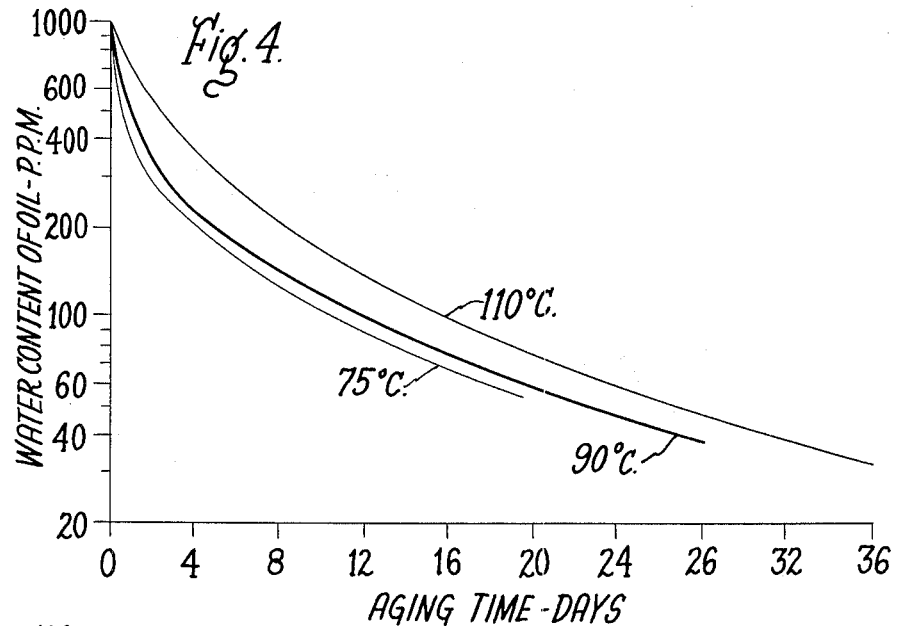

Jan. 11, 1966  M. J. BOLTON ETAL  3,229,023
THERMAL UPGRADING OF ELECTRICAL APPARATUS
Filed Oct. 21, 1963  3 Sheets-Sheet 1
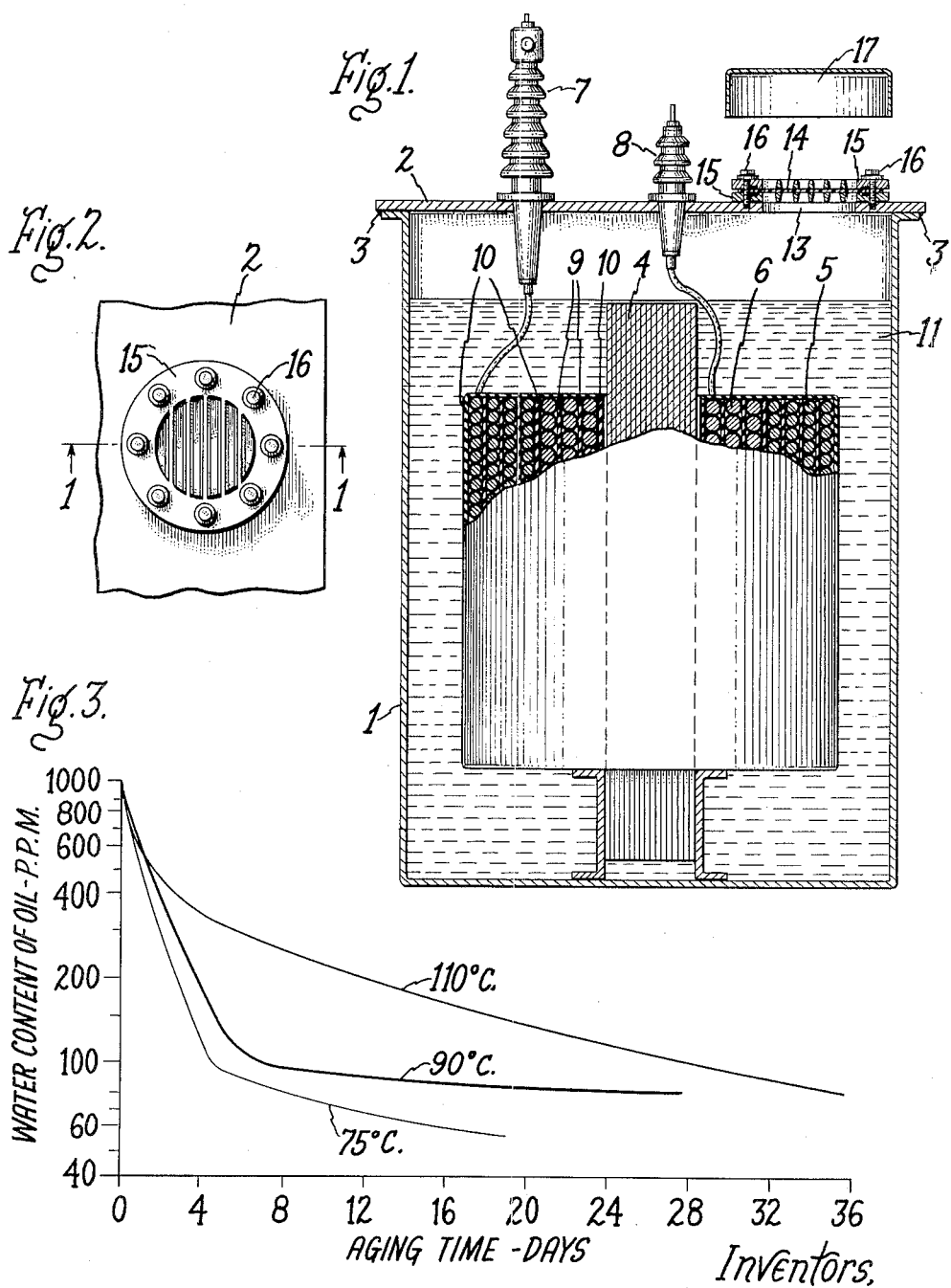
Inventors,
Michael J. Bolton,
Thomas G. Nichols,
by Gilbert P. Tarleton
Their Attorney.

Inventors,
Michael J. Bolton,
Thomas G. Nichols,
by Gilbert P. Tarleton
Their Attorney.

Jan. 11, 1966   M. J. BOLTON ETAL   3,229,023
THERMAL UPGRADING OF ELECTRICAL APPARATUS
Filed Oct. 21, 1963   3 Sheets-Sheet 3

Inventors,
Michael J. Bolton,
Thomas G. Nichols,
by Gilbert P. Tarleton
Their Attorney.

United States Patent Office 3,229,023
Patented Jan. 11, 1966

3,229,023
THERMAL UPGRADING OF ELECTRICAL APPARATUS
Michael J. Bolton and Thomas G. Nichols, Rome, Ga., assignors to General Electric Company, a corporation of New York
Filed Oct. 21, 1963, Ser. No. 317,446
11 Claims. (Cl. 174—14)

This invention relates to electrical apparatus and more particularly to improvements in sealed apparatus having cellulose insulated heat evolving electrical conductor.

An example of such apparatus is a power or distribution transformer which has a coiled multi-layer electrical conductor having synthetic resin turn insulation and cellulose layer and other insulation submersed in a dielectric liquid particularly mineral oil or askarel partially filling a sealed tank or casing having an inert gas cushion above the liquid level to allow for its thermal expansion and contraction.

It is well known that moisture in such apparatus should be minimized because it produces many undesirable results among which are an accelerated aging or embrittlement of the cellulose material, softening of certain synthetic resins and impairment of the insulation strength of dielectric fluids and liquids. However, mere predrying of the apparatus and its components prior to sealing is not enough because of the chemical composition of cellulose material contains the ingredients of water and when heated is degraded and evolves or gives off water even though it has been previously carefully dried so as to remove all absorbed water not a part of its chemical composition.

As heat is produced in such apparatus during normal operation, such as from the electrical resistance to current flow in its conductor or conductors, the resulting production of water has been a recognized problem for a number of years.

Two ways of combatting this problems which have been used are to place a desiccant material in the apparatus for removing water and chemically modifying or treating the cellulose material so as to reduce its ability to produce water.

In accordance with this invention, a port is provided in the tank or enclosure which is covered by a film or membrane which transmits water vapor but which is relatively impervious to other fluids in a transformer tank such as oil, askarel, oxygen or nitrogen. Polymeric materials such as polyvinyl alcohol or polyamide are suitable for the film or membrane. Such material transmits water vapor from the high vapor pressure side to the low vapor pressure side at a rate directly proportional to the difference in water vapor pressure on its opposite side and inversely proportional to its thickness. Under abnormal conditions, when the water vapor pressure on the outside is greater than on the inside, such as when the apparatus is de-energized and cold and the outside atmospheric humidity is high, the film or membrane can be covered by any suitable means so as to prevent water from entering the apparatus from outside through the film.

An object of the invention is to provide a new and improved electrical apparatus.

Another object of the invention is to provide a novel thermally upgraded electrical apparatus.

A further object of the invention is to provide novel means for removing evolved water from sealed electrical apparatus containing cellulose insulation.

The invention will be better understood from the following description taken in connection with the accompanying drawings and its scope will be pointed out in the appended claims.

Figure 5:
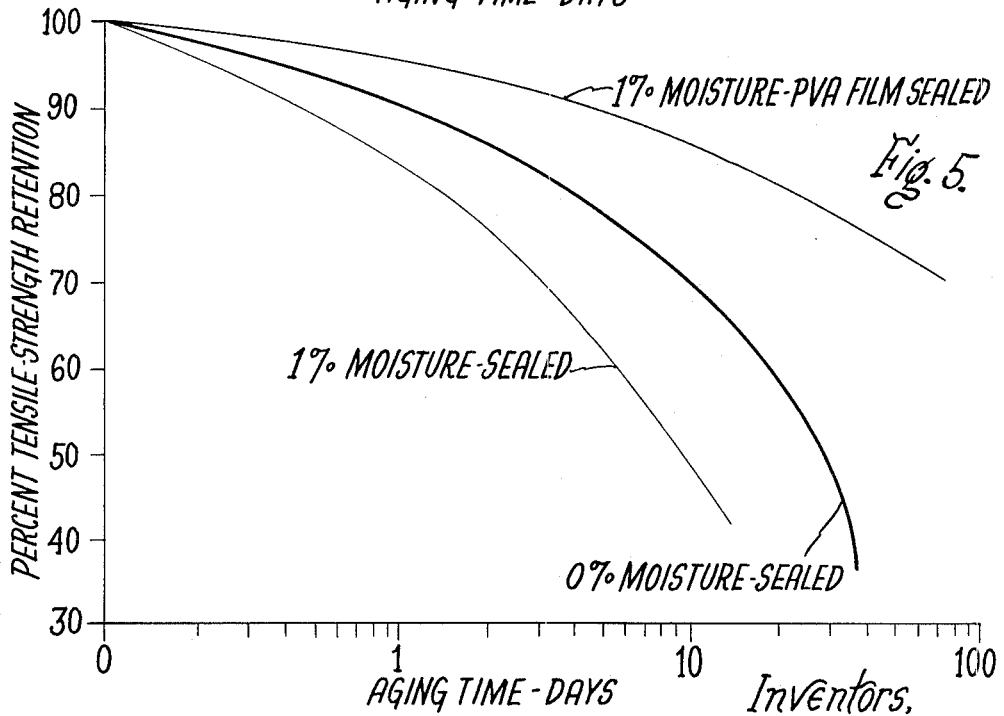

In the drawings:

FIG. 1 is a vertical partly broken away sectional view of a transformer embodying the invention, FIG. 2 is a detail plan view of a portion of FIG. 1 showing the water vapor pervious film mounting, FIG. 3 is a curve showing the rate of water removal from oil by means of a polyvinyl alcohol film at different operating temperatures, FIG. 4 is similar to FIG. 3 having a polyamide film or membrane, FIG. 5 is a graph showing percent tensile strength retention of cellulose paper versus time for apparatus having a polyvinyl alcohol film and apparatus which is completely sealed without such a film but with different starting percentages of moisture when the aging takes takes place at 150° C.

Figure 6:
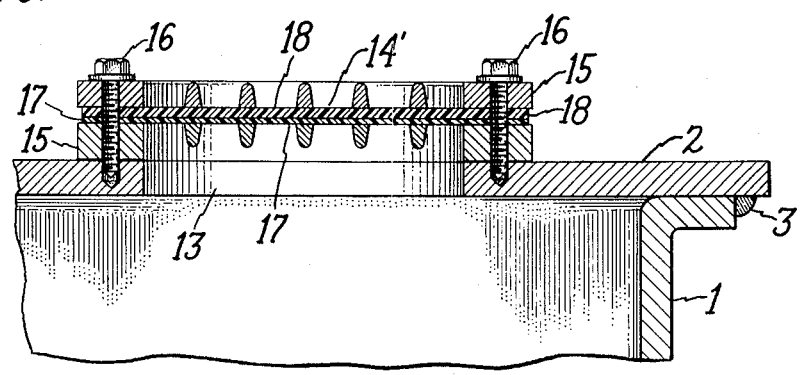
Figure 7:
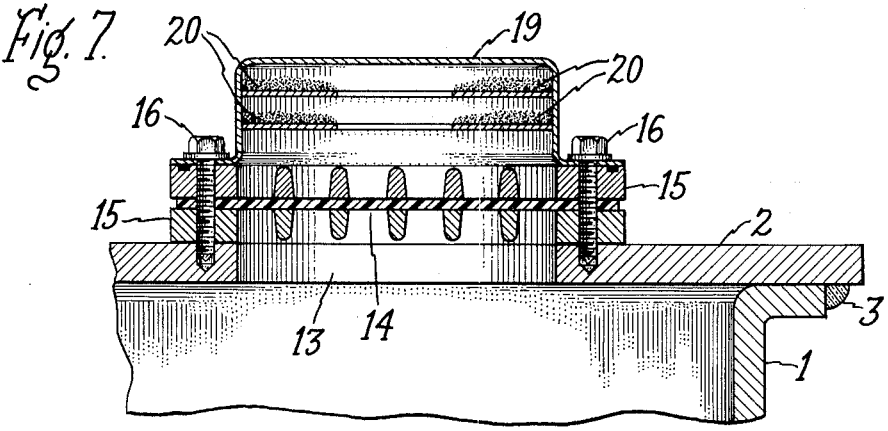

FIG. 6 shows a modification in the form of a composite film which has a check valve action and FIG. 7 shows a further modification for maintaining low water vapor pressure on the outer surface of the film or membrane.

Referring now to the drawings and more particularly to FIG. 1, there is shown therein a transformer tank 1 having a cover 2 sealed thereto by means of an edge weld 3. Mounted in the tank 1 is a magnetic core 4 and a coiled conductor or winding assembly comprising a high voltage winding 5 of relatively small diameter conductor and a low voltage winding 6 of relatively large diameter conductor, these windings respectively being connected by means of high and low voltage bushings 7 and 8 to outside terminals. The coiled conductor of both the windings 5 and 6 may be provided with an insulating film of synthetic resin of any well-known type for providing the so-called turn insulation of the windings. As shown, the windings have a plurality of concentric layers by sheet cellulose material such as kraft paper 9 which provides the layer insulation of the windings. In addition, there may be thicker cellulose insulation in the form of a pressboard cylinder or cylinders 10 for providing insulation between the windings and between the windings and ground or core 4. Partially filling the tank 1 and submerging the core and coils is a body of insulating liquid 11 such as mineral oil or askarel. Above the level of the liquid 11 there is a gas space or cushion 12 which may, for example, contain an inert gas such as nitrogen. This permits volumetric thermal expansion and contraction of the liquid 11 without producing excessive pressure changes in the tank 1.

An opening or port 13 is provided in either the tank wall or the cover 2 which is covered or sealed by a relatively thin film or membrane 14 which is supported between suitable elements 15 such as die cast aluminum grills, the whole assembly being suitably gasketed and attached to the tank or cover in any suitable manner such as by bolts 16. The area of the port 13 is not critical, nor is the thickness of the film 14, although as previously indicated its moisture transmitting ability is inversely proportional to its thickness. Good results have been obtained with films having thicknesses of between two mils and six mils. A cover or cap 17 is shown in FIG. 1 which can be manually or automatically placed over the port 13 when the transformer is cold and/or when the atmospheric humidity is abnormally high.

The operation of the embodiment of the invention illustrated in FIGS. 1 and 2 is as follows. Under normal operating conditions, the inherent electrical losses in the core and coil assembly will produce heat thus raising the temperature of the apparatus and not only vaporizing water which may be already present in the apparatus but also degrade or decompose the cellulose insulation so as to cause it to form water which in turn is vaporized. This water vapor will rise and create water vapor pressure in the gas cushion space 12 which water vapor pressure will normally exceed the water vapor pressure on the outside so that water vapor will pass out of the transformer through the membrane or film 14. In this manner, water is removed from the apparatus which insofar as other fluids or gases are concerned is an hermetically sealed apparatus.

FIG. 3 illustrates the ability of a polyvinyl alcohol film to remove moisture from mineral oil for various oil temperatures indicated respectively as 110° C., 90° C. and 75° C. The scale of water content of the oil is in parts per million and the curves in FIG. 3 show that for example at 75° C. the moisture content was reduced from one thousand parts per million to one hundred parts per million in four days.

FIG. 4 is similar to FIG. 3 but a polyamide film or membrane was used. These curves indicate that polyamide is not as effective as polyvinyl alcohol for removing moisture especially at the lower temperatures such as 75° C.

FIG. 5 shows the percent tensile strength retention of kraft paper aged in mineral oil at 150° C. The upper curve is for a system sealed with a polyvinyl alcohol film and having a moisture content corresponding to one percent by weight of the kraft paper. This curve shows that after ten days the paper had retained ninety percent of its initial one hundred percent tensile strength. The middle curve is for a system completely sealed without a film and with no absorbed or added moisture so that the only moisture produced by the degradation of the kraft paper at high temperature. This curve indicates that for a similar period of time of ten days the tensile strength of the paper had fallen to a little above seventy percent. The lowermost curve is for a system like that of the middle curve but with one percent of the paper weight of moisture present at the start and this curve shows that in ten days approximately half the tensile strength of the paper had been lost.

In FIG. 6 there is a composite membrane 14' comprising an inner film 17 and outer film 18. The inner film 17 may comprise polyvinyl alcohol one mil thick and the outer film 18 may comprise elastomeric silicone rubber three mils thick. It is not necessary that these films be bonded together. Tests on such an arrangement show that in a dry room water vapor permeates the composite film three times as rapidly when the polyvinyl alcohol film is on the inside as compared with when it is on the outside. Thus the composite film has a gate or check valve action in that it is more permeable to water vapor in the direction from the polyvinyl alcohol to the elastomeric silicone rubber than in the reverse direction. Ethyl cellulose and polyamide can also be used for the films, but the former is not particularly suitable for high temperature operation.

The operating principle of the composite membrane is believed to be that where two films have different rates of change of permeability with pressure, the composite membrane will be more permeable if the film having the greatest rate of change of permeability with pressure is exposed to the high pressure than if the gradient of pressure is reversed. As polyvinyl alcohol changes its permeability with pressure at a greater rate than elastomeric silicone rubber, the polyvinyl alcohol film should be on the inner or high pressure side for best permeability of water vapor.

In the modification shown in FIG. 7, a cover or cap 19 is placed over the membrane 14 or 14' and any suitable drying agent or desiccant material 20 such as silica gel is placed in the cover 19 such as on shelves 21. In this manner, the water vapor pressure on the outside of the film is maintained low independent of the atmospheric humidity so as to facilitate moisture removal. It has the advantage that the drying agent 20 can be replaced by removing the cap 19 without opening the main tank 1 of the electrical apparatus and if the vapors of the insulating fluid in the main tank 1 affects the drying agent this would be prevented because of the relative imperviousness of the membrane 14 to such vapors.

While the invention has been particularly shown and described in connection with liquid insulated transformers it will, of course, be obvious to those skilled in the art that it is in nowise so limited and that it will be useful in other forms of cellulose insulated heat evolving apparatus whether or not submerged in insulating liquid. For example, the insulating and cooling fluid can be a gas such as nitrogen or sulfahexafluoride or a number of different fluorocarbon gases, for example $C_3F_8$. Furthermore, some gas insulated transformers are operated at temperatures above the temperatures which cellulosic insulation can stand so that in such high temperature gas insulated transformers cellulosic insulation is not used. Nevertheless, moisture may be present in such transformers due either to incomplete drying or from aging degradation of noncellulosic materials, such as resins, adhesives and varnishes commonly used in high temperature gas transformers. Consequently, it should be understood that the invention is also suitable for removing moisture from such apparatus which does not necessarily have cellulosic insulation.

When gas insulation rather than liquid insulation is used there is, of course, no liquid level in the tank above which the port 13 should be placed and consequently the port and its covering mebrane can be placed anywhere in the tank wall. In such apparatus, it will ordinarily be preferable to place the moisture permeable film at a relatively cool or the coolest part of the container because, as has previously been indicated, moisture transmission is increased as the temperature is decreased.

While there have been shown and described particular embodiment of the invention, it will be obvious to those skilled in the art that changes and modifications may be made without departing from the invention, and therefore it is intended by the appended claims to cover all such changes and modifications as fall within the true spirit and scope of the invention.

What we claim as new and desire to secure by Letters Patent of the United States is:

1. Electrical apparatus comprising a sealed container partially filled with a body of dielectric liquid and having an aperture in one wall thereof above the liquid surface, said container providing above said liquid surface an expansion space containing gaseous fluids, current conducting means immersed in said liquid and including a cellulose insulated electric conductor, said conductor when carrying normal load current heating said cellulose and said liquid sufficiently to generate and drive into said expansion space the vapors of water and of said dielectric liquid, the vapor pressure in said expansion space under normal load conditions being greater than the ambient pressure outside said container, and a water vapor pervious membrane closing said aperture and formed of a material substantially impervious to said dielectric liquid vapor and other non-aqueous fluids in said expansion space, whereby under normal electrical load and outside ambient pressure conditions said membrane selectively exhausts only water vapor from said expansion space.

2. Apparatus as defined in claim 1 wherein a cushioning body of inert gas is contained in said expansion space.

3. Apparatus as defined in claim 1 in which said membrane comprises polyvinyl alcohol.

4. Apparatus as defined in claim 1 in which said membrane comprises two superposed films of material having different rates of change of water vapor pressure on opposite sides, the film with the highest rate of change of permeability being on the inside.

5. Apparatus as defined in claim 1 in which a desiccant material is positioned adjacent the outer surface of said membrane.

6. Electrical apparatus comprising a sealed container at least partially filled with a dielectric fluid and enclosing a heat-evolving conductor immersed in said fluid, said container having an aperture in one wall thereof and containing a source of water vapor under heat-evolving electrical load conditions, and a water vapor permeable membrane closing said aperture and formed of a material substantially impervious to gas and vapor other than water vapor, said membrane selectively exhausting water vapor from said container whenever water vapor pressure within said container exceeds the external ambient water vapor pressure.

7. Apparatus as defined in claim 6 in which said membrane comprises polyvinyl alcohol.

8. Apparatus as defined in claim 6 in which said membrane comprises two superposed films of material having different rates of change of water vapor permeability with changes in differential water vapor pressure on opposite sides, the film with the highest rate of change of permeability being on the inside.

9. Apparatus as defined in claim 6 in which desiccant material is positioned adjacent the outer surface of said membrane.

10. Apparatus as defined in claim 6 wherein said conductor has associated therewith a body of cellulose insulation which is adversely effected by moisture.

11. Apparatus as defined in claim 1 in which said membrane comprises an inner film of polyvinyl alcohol and an outer film of elastomeric silicone rubber.

References Cited by the Examiner
UNITED STATES PATENTS

| | | | |
|---|---|---|---|
| 1,622,030 | 3/1927 | Edwards | 174—14 X |
| 1,759,971 | 5/1930 | Austin. | |
| 3,159,508 | 12/1964 | Chreitzberg. | |

OTHER REFERENCES

Elvanol, E. I. du Pont de Nemours and Co. (Inc.), Wilmington, Delaware (Copyright 1947) (pages 40 relied on).

References Cited by the Applicant
UNITED STATES PATENTS

| | | |
|---|---|---|
| 1,024,598 | 4/1912 | Randall et al. |
| 1,476,138 | 12/1923 | Bingay. |

BERNARD A. GILHEANY, *Primary Examiner.*

JOHN F. BURNS, *Examiner.*

D. J. BADER, *Assistant Examiner.*